United States Patent
Tough

(10) Patent No.: US 10,688,936 B2
(45) Date of Patent: Jun. 23, 2020

(54) ROOF RAIL FOR VEHICLES

(71) Applicant: BENTLEY MOTORS LIMITED, Cheshire (GB)

(72) Inventor: Iain Tough, Cheshire (GB)

(73) Assignee: BENTLEY MOTORS LIMITED, Crewe, Cheshire (GB)

(*) Notice: Subject to any disclaimer, the term of this patent is extended or adjusted under 35 U.S.C. 154(b) by 48 days.

(21) Appl. No.: 15/537,336

(22) PCT Filed: Dec. 16, 2015

(86) PCT No.: PCT/GB2015/054024
§ 371 (c)(1),
(2) Date: Jun. 16, 2017

(87) PCT Pub. No.: WO2016/097720
PCT Pub. Date: Jun. 23, 2016

(65) Prior Publication Data
US 2017/0349107 A1    Dec. 7, 2017

(30) Foreign Application Priority Data

Dec. 18, 2014 (GB) .................................. 1422652.6

(51) Int. Cl.
*B60R 9/04* (2006.01)
*B60R 13/04* (2006.01)
*B60R 9/045* (2006.01)

(52) U.S. Cl.
CPC ................ *B60R 9/04* (2013.01); *B60R 9/045* (2013.01); *B60R 13/04* (2013.01)

(58) Field of Classification Search
CPC .......... B60R 9/052; B60R 9/048; B60R 9/058
USPC .................................................. 224/322, 323
See application file for complete search history.

(56) References Cited

U.S. PATENT DOCUMENTS

| 4,834,448 A | * | 5/1989 | Sakamoto ............... B60R 9/058 296/210 |
| 5,013,083 A | * | 5/1991 | Yada ....................... B60R 13/04 296/210 |
| 5,155,887 A | * | 10/1992 | Stahl ....................... B60R 13/04 24/293 |
| 5,732,863 A | * | 3/1998 | Stapleton ............... B60R 9/045 224/309 |
| 5,975,391 A | * | 11/1999 | Aftanas .................... B60R 9/04 224/309 |
| 6,176,404 B1 | * | 1/2001 | Fourel .................... B60R 9/052 224/309 |

(Continued)

FOREIGN PATENT DOCUMENTS

DE          9407580 U1    9/1994
DE   202007001742 U1    5/2007

(Continued)

*Primary Examiner* — Brian D Nash
(74) *Attorney, Agent, or Firm* — Schwabe Williamson & Wyatt, P.C.

(57) ABSTRACT

A roof rail (20) is adapted to be attached to the roof (21) of a vehicle, to allow items to be carried on the roof via a crossbar (22) clamped thereto. The roof rail (20) includes a trim attachment portion (23), to which a trim (24) formed of brightware or the like can be attached. The trim attachment portion (23) extends between a top wall and a projecting portion of an outboard sidewall of the rail (20).

12 Claims, 7 Drawing Sheets

(56) References Cited

U.S. PATENT DOCUMENTS

| | | | | |
|---|---|---|---|---|
| 6,311,882 B1* | 11/2001 | Allison | | B60R 9/04 224/309 |
| 6,564,433 B2 | 5/2003 | Nagasawa | | B60R 13/04 24/289 |
| 6,568,748 B2* | 5/2003 | Yoon | | B60R 9/04 224/314 |
| 6,974,181 B2* | 12/2005 | Mikkaichi | | B60R 13/04 296/210 |
| 7,004,535 B1* | 2/2006 | Osterberg | | B60R 13/04 296/203.03 |
| 7,029,060 B1* | 4/2006 | Osterberg | | B60R 13/04 296/203.03 |
| 7,045,189 B2* | 5/2006 | Hui | | B60R 13/04 296/210 |
| 7,401,395 B2* | 7/2008 | Unger | | B60R 9/04 29/451 |
| 7,695,038 B2* | 4/2010 | Harberts | | B60R 13/04 296/1.08 |
| 8,627,989 B2* | 1/2014 | Aftanas | | B60R 9/058 224/309 |
| 8,657,370 B1* | 2/2014 | Pierce | | B60R 13/06 296/210 |
| 9,022,264 B2* | 5/2015 | Jutila | | B60R 9/058 224/321 |
| 2002/0037389 A1* | 3/2002 | Miyano | | B29C 45/4407 428/99 |
| 2005/0189792 A1* | 9/2005 | Unger | | B60R 9/04 296/210 |
| 2006/0131934 A1* | 6/2006 | Uchida | | B60R 9/058 296/210 |
| 2007/0227073 A1* | 10/2007 | Tognetti | | B60J 10/30 49/377 |
| 2008/0083800 A1* | 4/2008 | Mathew | | B60R 9/04 224/326 |
| 2009/0021053 A1* | 1/2009 | Harberts | | B60R 13/04 296/213 |
| 2009/0188198 A1* | 7/2009 | Scroggie | | B60R 13/04 52/716.7 |
| 2011/0010898 A1* | 1/2011 | Scroggie | | B60R 13/04 24/292 |
| 2012/0025564 A1* | 2/2012 | Ellis | | B60J 10/79 296/146.9 |
| 2014/0097218 A1* | 4/2014 | Bittner | | B60R 9/04 224/309 |
| 2014/0131406 A1* | 5/2014 | Jutila | | B60R 9/058 224/321 |
| 2015/0175082 A1* | 6/2015 | Aftanas | | B60R 9/058 224/309 |
| 2015/0191127 A1* | 7/2015 | Sautter | | B60R 9/08 224/331 |
| 2015/0232038 A1* | 8/2015 | Robertson | | B60R 9/052 224/325 |
| 2015/0274083 A1 | 10/2015 | Gunthner | | |
| 2015/0274084 A1* | 10/2015 | Sarges | | B60R 9/058 224/315 |
| 2016/0167590 A1* | 6/2016 | Sandberg | | B60R 9/042 224/310 |
| 2016/0280143 A1* | 9/2016 | Sato | | B60R 9/045 |
| 2017/0015253 A1* | 1/2017 | Shibata | | B60J 10/36 |

FOREIGN PATENT DOCUMENTS

| | | |
|---|---|---|
| DE | 202014102150 U1 | 7/2014 |
| EP | 2011693 B1 | 1/2009 |
| EP | 2543548 A1 | 1/2013 |
| FR | 2632595 A1 | 12/1989 |
| GB | 2512335 A | 10/2014 |
| JP | H0565043 A | 3/1993 |
| JP | 2003034210 A | 2/2003 |
| JP | 2013173499 A | 9/2013 |
| WO | WO2006130078 A1 | 12/2006 |
| WO | WO2014015919 A1 | 1/2014 |

\* cited by examiner

ROOF RAIL FOR VEHICLES

CROSS REFERENCE TO RELATED APPLICATIONS

The present application is a national phase entry under 35 U.S.C. § 371 of International Application No. PCT/GB2015/054024, filed Dec. 16, 2015, entitled "ROOF RAIL FOR VEHICLES," which designated, among the various States, the United States of America, and which claims priority to GB 1422652.6 filed Dec. 18, 2014, both of which are hereby incorporated by reference.

TECHNICAL FIELD OF THE INVENTION

The present invention relates to a roof rail, in particular to a roof rail for an automobile which is capable of accommodating a piece of trim, and to a crossbar having a clamp adapted to clamp to such a roof rail.

BACKGROUND TO THE INVENTION

Some automobiles are provided with roof rails which extend along the length of a vehicle, one on each side. In order to carry items on the roof of such automobiles, crossbars (usually a pair thereof) are attached to the roof rails and roof boxes, or dedicated carriers for particular equipment (e.g. skis or bicycles) are attached to the crossbars.

A cross section through a conventional roof rail and crossbar is shown in FIG. 1. The roof rail 1 is formed of extruded aluminium and is of hollow cross section, with upper and lower chambers separated by a strengthening brace 2. From the sides of a lower plate 3 (for attachment to a roof), an upstanding inboard sidewall 4 and an upstanding outboard sidewall 5 extend. In the region of the brace 2, a projecting ridge 6 extends outwardly from the outboard sidewall 5. A sloping portion 7 then extends upwardly and inwardly from the outer edge of the projecting ridge 6, to meet the outboard edge of a flat top wall 8, which extends the majority of the width of the rail, as defined by the distance from the inner edge of the inboard sidewall 4 to the outer edge of the projecting ridge 6.

The crossbar 9 clamps onto the roof rail by means of a pair of resilient clamping jaws 10, 11. The inboard jaw 11 has a side portion 12, which extends along a portion of the length of the inboard wall 4, and has a top portion 13 which sits on the top wall 8 of the roof rail 1. The outboard jaw 10 has a side portion 14 which abuts the outer edge of the projection 6 and an inwardly extending portion 15 extending under the projection 6.

The side portions 12, 14 of the jaws 10, 11 clamp the roof rail between them, preventing it from moving back and forth, falling off or rattling. When the vehicle is stationary, force from the items carried by the crossbar is applied downwards onto the top wall 8 of the roof rail 1 via the top portion 13 of the inboard jaw 11. When the vehicle is in motion, an upward force can be applied by the items carried by the crossbar; this force is applied upward through the projection 6 via the inwardly extending portion 15.

Accordingly, the jaws 10, 11 clamp against much of the outer surface of the roof rail (in the portion along its length where they are attached), and hence the rail is a largely utilitarian part of the vehicle which is not easily finished with fragile decoration. Tough plastic covers, paint and decals may be applied to the surface of the roof rails, but all of these can be damaged by the jaws of the crossbar, or interfere with the strength of the clamping action of the jaws.

This invention seeks to provide a roof rail in which decorative features are not detrimental to the clamping action of the crossbar and/or are not damaged by the crossbar.

SUMMARY OF THE INVENTION

According to a first aspect of the invention there is provided a roof rail comprising a roof attachment portion; an inboard sidewall and an outboard sidewall; a projecting portion projecting outwardly from the outboard sidewall; and a top wall extending from the inboard side wall; characterised by a trim attachment portion which extends between the top wall and the projecting portion.

Providing a trim attachment portion in this region allows for trim (e.g. a brightware insert) to be attached to the roof rail in an area where it will be highly visible, but need not come into contact with the clamp of a suitable crossbar.

The trim attachment portion may be shaped to define a recess inward of the top wall.

The top wall extends from the inboard side outwardly, i.e. in the direction of the outboard side. The recess extends inward of the top wall (i.e. towards the central axis of the roof rail) and defines a region into which a piece of trim can be inserted. Because the region where the trim can be inserted is recessed with respect to the top wall, trim attached thereto will not come into contact with (and interfere with or be damaged by) the top portion of the inboard jaw of the clamp of a crossbar.

The trim attachment portion may extend between an inward surface of the top wall and the projecting portion. This simplifies formation of the recessed portion.

The trim attachment portion may extend between the top wall and an inward surface of the projecting portion. This provides more space outwardly of the trim attachment portion, to locate the trim.

The roof rail may comprise a brace extending between the projecting portion and the inboard sidewall; and the trim attachment portion may extend between the brace and the top wall.

The outboard sidewall may be adapted to bear an inward force from a clamp associated with a crossbar.

The trim attachment portion may be provided with fastening means to attach the trim, which may be spaced along its length.

The fastening means may comprise apertures adapted to receive clips provided on a piece of trim.

The trim attachment portion may be provided with a trim support for supporting and aligning the trim.

The trim support may comprise a rib projecting outwardly from the trim attachment portion to mate with a groove associated with the trim.

Alternatively, the trim support may comprise a groove into which one or more ribs associated with the trim may be located.

The top wall of the roof rail may be less than or half of the width of the roof rail at its widest portion and may be about a third of the width of the roof rail at its widest portion. This provides sufficient width to support items bearing down on the roofrail via a clamp associated with a crossbar, but is sufficiently narrow that the primary surface visible from above is the trim, attached to the trim attachment portion, which covers the remaining portion of the roof rail The roof rail may be provided with a brace extending between the inboard sidewall and the trim attachment portion. The brace extend to the trim attachment portion in the region of the recess, or in the region of the outwardly projecting portion.

The roof rail may be provided with trim, attached to the trim attachment portion thereof.

The trim may comprise brightware. The brightware may be of stainless steel. Stainless steel, especially when post-polished is considered a particularly desirable and decorative material for trim, but could be easily damaged by clamping forces. Accordingly this invention is especially useful where the trim comprises brightware and for stainless steel in particular.

The trim may comprise other fragile decorative materials. For example, the trim may comprise carbon fibre or contrasting colour trim applied to a material which would be damaged by application of force from the clamping jaws of the crossbar described in relation to the prior art.

The trim may be generally c-shaped in cross section, having a main body portion which extends between the outboard edge of the top wall and beyond the outboard edge of the projecting portion; a tip curving inwardly into the recess and a tail curving inwardly towards the outboard edge of the projecting portion.

The trim may comprise fastening means to fasten the trim to the trim attachment portion, which may comprise clips adapted to clip to apertures in the trim attachment portion.

The trim may comprise an aligner for aligning with, and to be supported by, a trim support associated with the trim attachment portion. The trim aligner may be provided on the clips of the trim and may be one or more ribs, tongues or grooves.

According to a second aspect of the invention, there is provided a crossbar for attachment to a roof rail as set out above, the crossbar comprising a clamp for clamping to the roof rail and the clamp comprising an inboard jaw and an outboard jaw, the inboard jaw having a side portion adapted to engage with the inboard sidewall of the roof rail and a top portion adapted to engage with the top wall of the roof rail, wherein the outboard jaw comprises a long inwardly extending extension adapted to bear on the underside of the projection and the outer surface of the outer sidewall and whereby in use the clamp does not contact the trim attached to the trim attachment means.

The long inwardly extending extension may be provided with a resilient cap to protect and conform to the shape of the underside of the projection and the outer surface of the outer sidewall.

The resilient cap may be U-shaped.

The long inwardly extending extension may be 1 cm or more long, preferably 1.5 cm or more long and even more preferably 2 cm or more long.

The inboard jaw may comprise a resilient clamping surface with a tapering tip.

The resilient clamping surface may have a side wall abutment surface which tapers at its tip.

The resilient clamping surface may have a top wall abutment surface which tapers at its tip.

The resilient clamping surface may be L-shaped in cross section with both a side wall abutment surface which tapers at its tip and a top wall abutment surface which tapers at its tip.

A third aspect of the invention provides a crossbar according to the second aspect of the invention in combination with a roof rail according to the first aspect of the invention.

DETAILED DESCRIPTION OF THE INVENTION

In order that the invention may be more clearly understood embodiments thereof will now be described, by way of example only, with reference to the accompanying drawings, of which:

FIG. 5a shows an isometric view of the roof rail and trim of FIGS. 2 and 3;

FIG. 5b shows an isometric view of a portion of the roof rail and trim of FIG. 5a;

Figure 1:
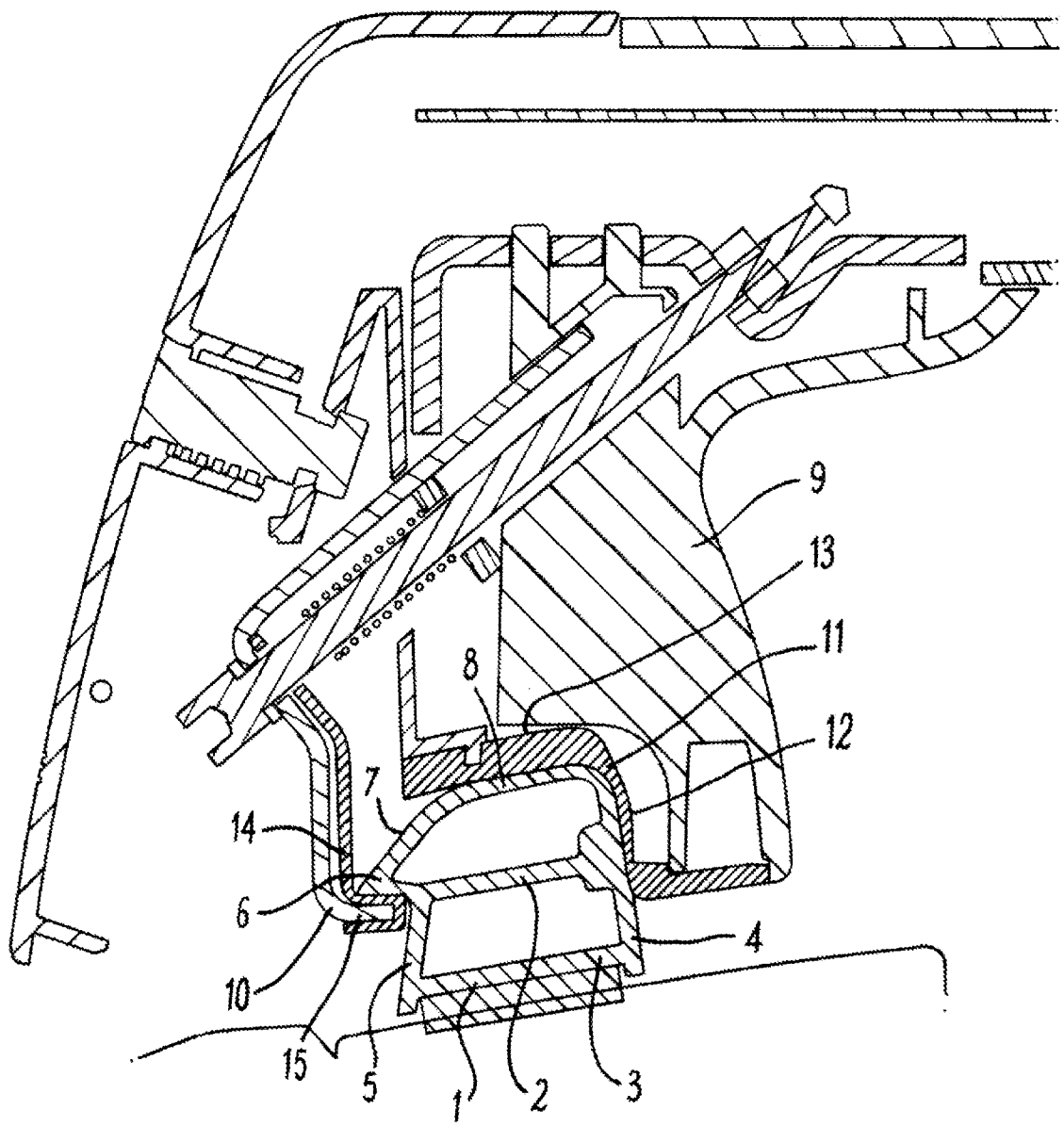
FIG. 1 shows a cross section through a conventional roof rail and crossbar.
Figure 2:
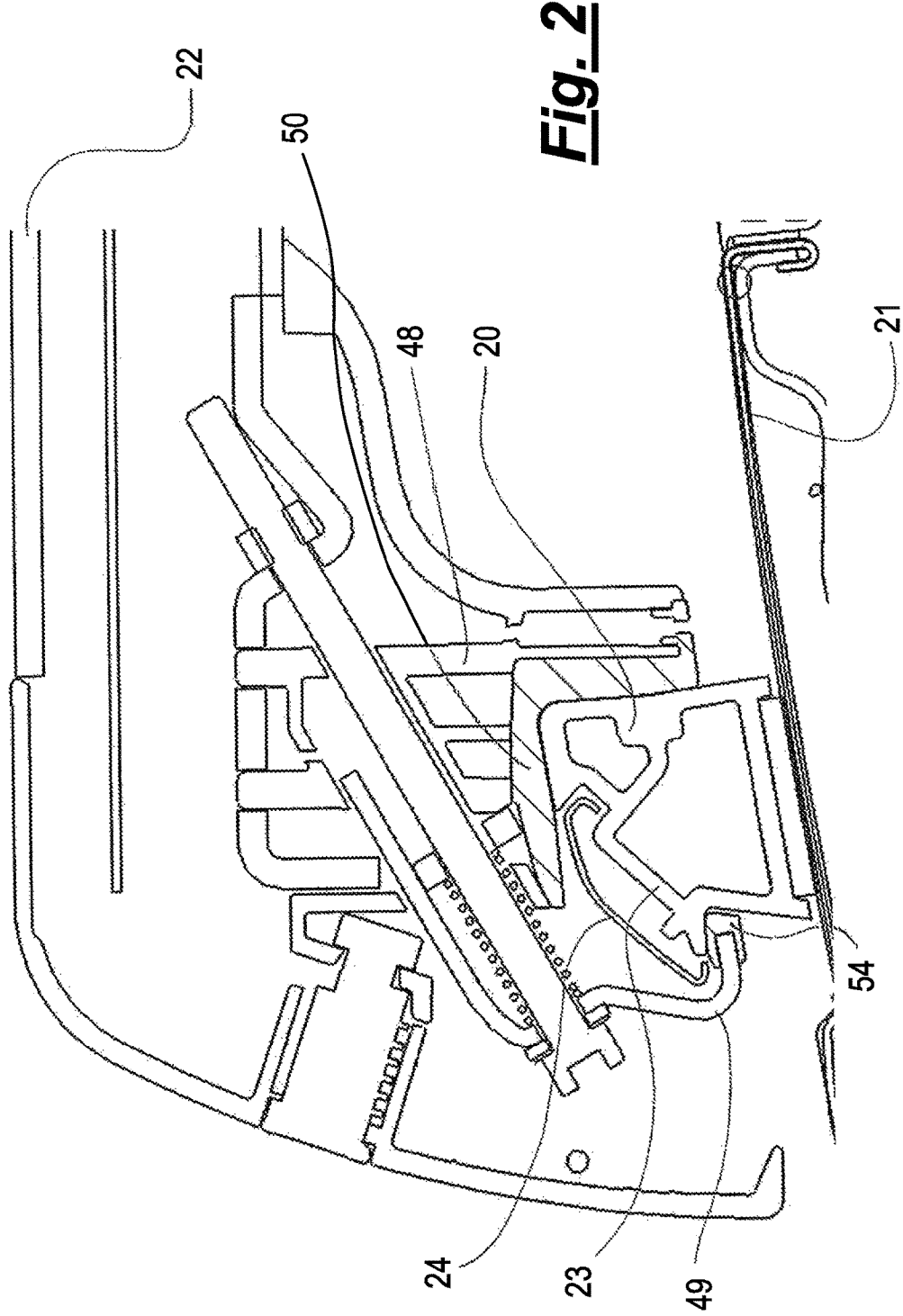
FIG. 2 shows a cross section through a roof rail, trim and crossbar according to a first embodiment of the invention.
Figure 3:
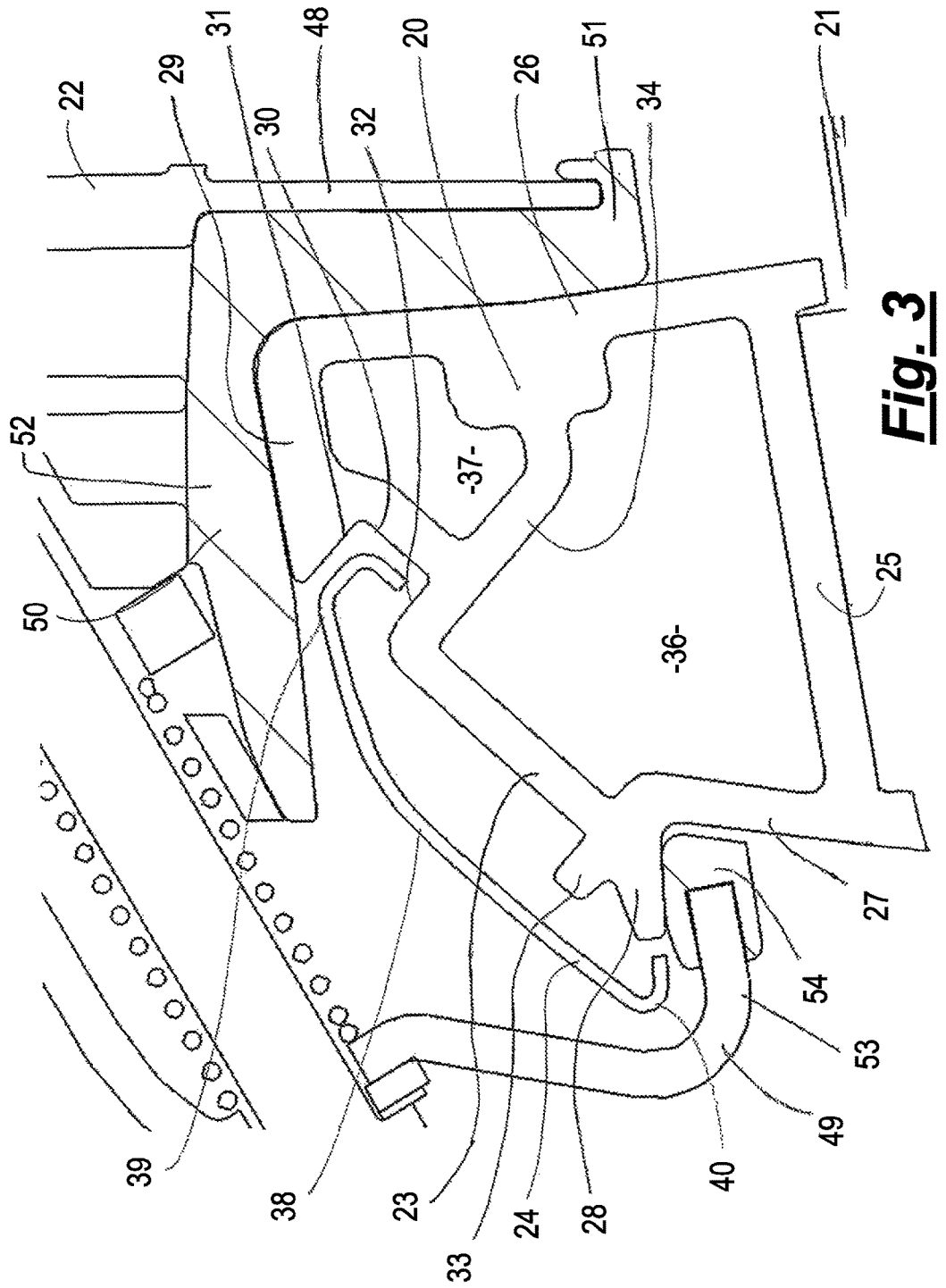
FIG. 3 shows an enlarged portion of the roof rail, trim and crossbar of FIG. 2.

With reference to FIGS. 2 and 3, a roof rail 20 is adapted to be attached to the roof 21 of a vehicle, to allow items to be carried on the roof 21 via a crossbar 22 clamped thereto. The roof rail 20 includes a trim attachment portion 23, to which trim 24 formed of brightware or the like can be attached.

In practise, two roof rails 20 will be attached to a roof 21 with crossbars 22 (normally two) spanning between them. In use the roof rails 20 extend from the front to the rear of the roof 21, one on each side. Each roof rail 20 is a mirror image of the other roof rail 20 and each has one side intended to face inboard, i.e. towards the other roof rail 20 and one side intended to face outboard. In this description, only one roof rail 20 will be described.

The roof rail 20 of the first embodiment of the invention is formed by extrusion, in this example extruded aluminium, which provides a strong and light support. The roof rail 20 is formed so as to include a roof attachment portion 25, which is a plate-like sheet which, in use is attached to the roof 21 by conventional means (e.g. bolts).

An inboard sidewall 26 extends upwardly, perpendicular to the roof attachment portion 25 and bulges outward (i.e. inboard) very slightly in its top half. On the opposite side of the roof attachment portion, an outboard sidewall 27 extends upwardly. Although it extends generally in the direction perpendicular to the roof attachment portion 25, the outboard sidewall 27 extends less perpendicularly than the inboard sidewall 26, instead extending inwardly (i.e. inboard) so as to define an acute angle with respect to the plane of the roof attachment portion 25.

The outboard sidewall 27 is of only about half the height of the inboard sidewall 26 and at its top, an outwardly extending projecting portion 28, in the form of a ridge, projects outboard from the roof rail 20. On the other hand, at the top of the inboard sidewall 26, a top wall 29 is formed. The top wall 29 extends outwardly (i.e. outboard) from the inboard sidewall 26, generally perpendicular to the plane of the inboard sidewall 26 and parallel to the plane of the roof attachment portion 25. The top wall 29 only extends partially across the width of the roof rail 20, between about a third and half of the width of the roof rail 20 at its widest point (which is between the outer edge of the outwardly extending projecting portion 28 and the inner wall 26.

From the outermost edge of the top wall 29, a recess 30 is formed. The recess is formed as a groove which extends inwardly and inboard, i.e. towards the inboard wall 26, such that the inwardly extending wall 31 of the groove forms an acute angle with the plane of the top wall 29. The opposite side of the groove 32 is formed by the trim attachment portion 23 of the roof rail 20. The recess 30 is of substantially square cross section, such that its depth both on the side 31 bounded by the top wall 29 and the side 32 bounded by the trim attachment portion 23 is substantially equal. Accordingly, owing to the direction in which the groove extends (i.e. towards the inboard sidewall 26), the top of the groove on the side 32 bounded by the trim attachment portion 23 is lower than the top of the groove on the side 31 bounded by the top wall 29.

The trim attachment portion 23 slopes downwardly (i.e. towards the plane of the roof attachment portion 25) and outwardly (i.e. outboard), to meet the outboard sidewall 27 inboard of the outer edge of the projecting portion 28. A support rib 33 extends outwardly perpendicularly to the trim attachment portion 23 in the region where it is joined to the outboard sidewall 27 and the projecting portion 28.

Between the groove 30, at the side of the trim attachment portion, and the mid-point of the inboard sidewall 26, a brace 34 extends, separating the roof rail into two chambers: a large chamber 36 bounded by the inner surfaces of the roof attachment portion 25, the lower half of the inner side wall 26, the outer side wall, 27, the roof attachment portion 23 and the brace 34; and a smaller chamber 37 defined by the inner surfaces of the upper half of the inboard sidewall 26, the top wall 29, the bottom of the groove 30 and the brace 34.

Figure 4:
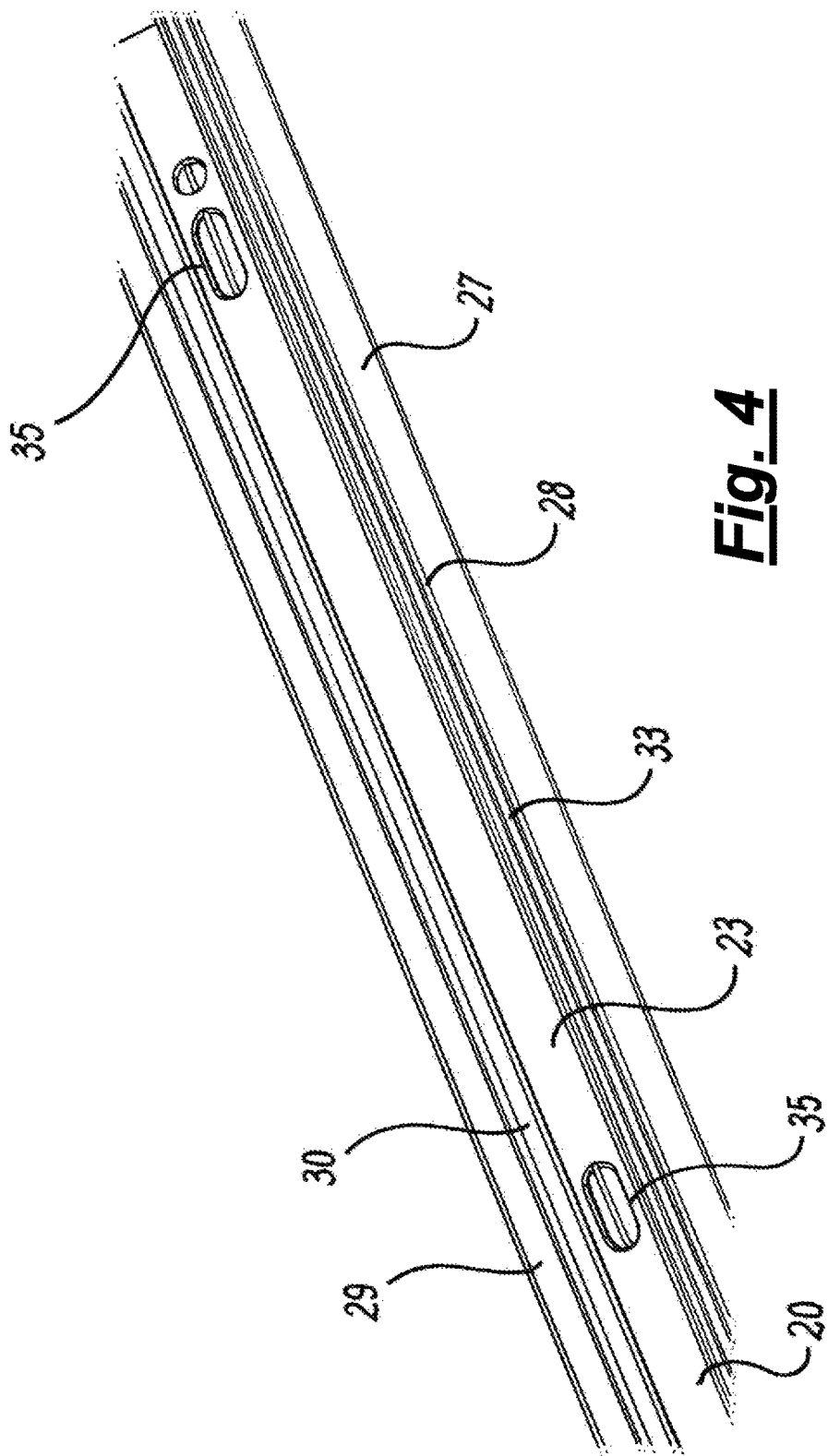
FIG. 4 shows an isometric view of a portion of the roof rail as shown in FIGS. 2 and 3 without the trim.

As shown in FIG. 4, the trim attachment portion 23 includes apertures 35 spaced along it (e.g. eight apertures 35 spaced 25 cm apart along a roof rail 20 about 180 cm long). The apertures 35 are generally rectangular, with rounded edges and serve as fastening means to receive clips attached to the trim 24.

Figure 5:
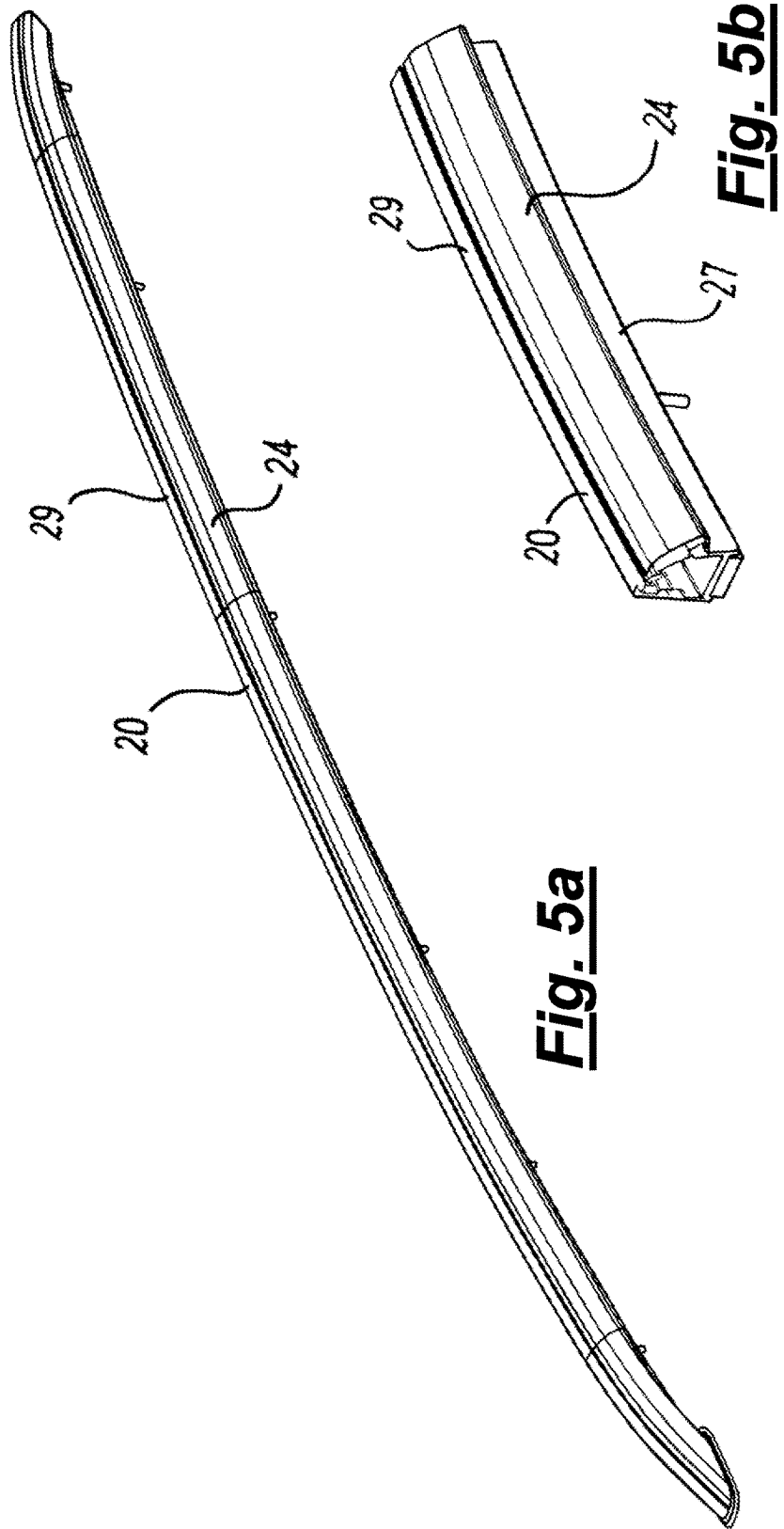

As shown in FIGS. 2 and 3, the trim 24 is of a generally c-shaped cross section, having a main body portion 38 which extends between the outboard edge of the top wall 29 and beyond the outboard edge of the projecting portion 28; a tip 39 curving inwardly into the recess and back on itself and a tail 40 curving inwardly back towards the outboard edge of the projecting portion. The body portion 38 is slightly bent, initially following the line of the top wall, before curving downwards so as to end in line with the plane of the projecting portion 28, thus (as can be seen from FIGS. 5a and 5b) the trim portion 24 covers the majority of the area which is visible from the side of the automobile, with only the outboard side wall 27 (which will normally be in the shadow of the trim 24) and a small portion of the top wall 29 on view. Especially when the trim is of brightware, e.g. polished stainless steel, it will be the dominant visual feature of the roof rail.

Figure 6:
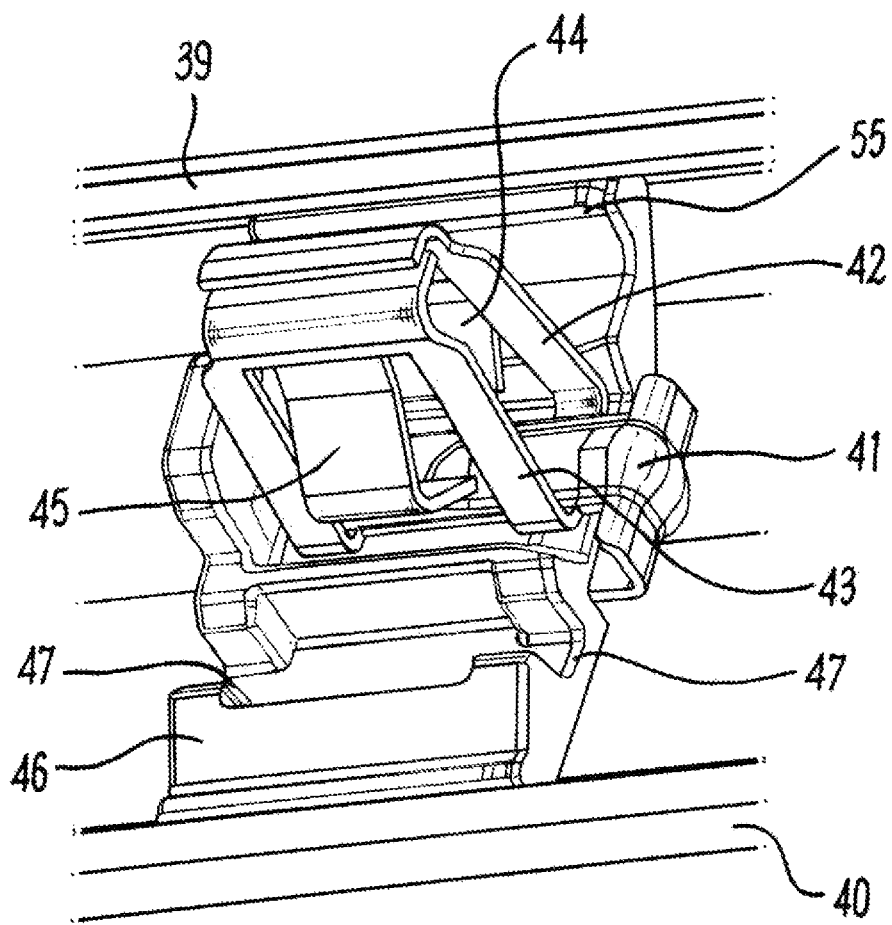
FIG. 6 shows an isometric view of a portion of the underside of the trim of FIGS. 2, 3, 5a and 5b and a clip attached thereto.

FIG. 6 shows a clip 41 for attaching the trim 24 to the rail 20. The clip 41 has two lugs 42, 43 extending therefrom, and overlapping at their ends. The lugs 42, 43 are sized to fit through the apertures 35, but are resiliently biased away from each other, and each have a finger 44, 45 extending from the tip of the clip 41 back towards the trim 24. These fingers 44, 45 extend outwards from the lugs 41, 42 and are resiliently biased outwards, but as the tip of the lugs 42, 43 is pushed into the aperture, they are forced together, in turn forcing the lugs 42, 43 together. The ends of the fingers 44, 45 closest to the trim 24, extend back inwards towards each other, such that once the widest part is passed, they exert a force on the aperture 35 urging the trim 24 inward into engagement with the roof rail 20. The clips 41 are attached to the trim 24 by means of a connector 46.

The connector 46 has an outer surface which conforms with the inner surface of the body portion 38 of the trim 24 and the grooves formed by the tip 39 and the tail 40 of the trim 24, so as to be held in place between them. The connector 46 associated with the trim 24 is also provided with a groove 47, (located in use between the clip 41 and the tail 40 of the trim 24) which mates with the support rib 33 on the roof rail 20 to act as an aligner, aligning the trim 24 on the roof rail 20. At the other end of the connector 46, located between the clip 41 and the tip 29 of the trim 24 (in use), a guide surface 55 is formed which mates with the corner of the recess 30 formed by the trim attachment portion 23, so as to hold the trim 24 in the correct position with respect to the top surface 29 of the roof rail 20.

Referring once again to FIGS. 2 and 3, the clamp of the crossbar 22 is modified as compared to the prior art crossbar to fit the novel roof rail 20 and avoid impacting the trim 23. The crossbar 22 comprises a pair of jaws 48, 49; an inboard jaw 48, which clamps onto the inboard side 26 and the top wall 29 of the roof rail 20, and an outboard jaw 49, which clamps onto the outboard side wall 27 and the underside of the projecting portion 28. The inboard jaw 48 is distinguished from the prior art because of the shape of the resilient clamping surface 50 which covers the inboard jaw 48. The resilient clamping surface 50 of the inboard jaw is generally L-shaped with two perpendicular surfaces: a side wall abutment surface 51, which tapers at its tip in order to conform with the change in shape of the inboard side wall 26 which bulges slightly outward towards the top half; and a top wall abutment surface 52, which also tapers towards its tip, in order to avoid contacting the trim 24. The outboard jaw 49 jaw is primarily distinguished by its long inwardly extending extension 53 adapted to bear on the underside of the projection 28 and the outer surface of the outer sidewall 27. The inwardly extending extension 53 includes a resilient U-shaped cap 54, which contacts the underside of the projection 28 and the side wall 27, but does not contact the outer end of the projection, or the trim that extends beyond it. No resilient cover is provided on the outboard jaw, except for the U-shaped cap 54, since only the U-shaped cap 54 should bear on any part of the roof rail 20 and a resilient cover on the inside of the jaw in the region outboard of the projection 28 would require the extension 53 to be even longer to compensate for the width of the resilient cover and the additional length would put more strain on the jaw 49.

In use, two roof rails 20 are attached to the roof 21 of a vehicle, each with its inboard side facing inward and its outboard side facing outward and the trim 23 is clipped to the roof rails 20 via the clips 41 and their associated connectors 46. This may be carried out in manufacturing, or as a later modification to an existing vehicle. When it is desired to attach a crossbar 22 to the roof rails 20, each of two pairs of jaws 48, 49 forming a pair of clamps on a crossbar 22 is then opened, such that a wide space is provided between the jaws 48, 49 and their respective resilient clamping surfaces 50, 54. The crossbar 22 is then placed onto the roof rails 20, such that the top wall abutment surfaces 52 of each clamp sit on the top wall 49 of each roof rail 20, and the side wall abutment surface 51 of each inboard jaw 48 abuts each respective inboard sidewall 26. The clamps are then tightened such that the outboard jaws 49 move inward, until the resilient clamps 54 are tightly located against the outboard sidewall 27 and the underside of the projecting portion 28. Despite contacting the relatively narrow top surface 29 of the roof rail 20 and not contacting the outer edge of the projection 28 at all, a tight clamping force can be applied to each rail, such that movement in all directions is prevented, even when the crossbar is put under substantial load.

Figure 7:
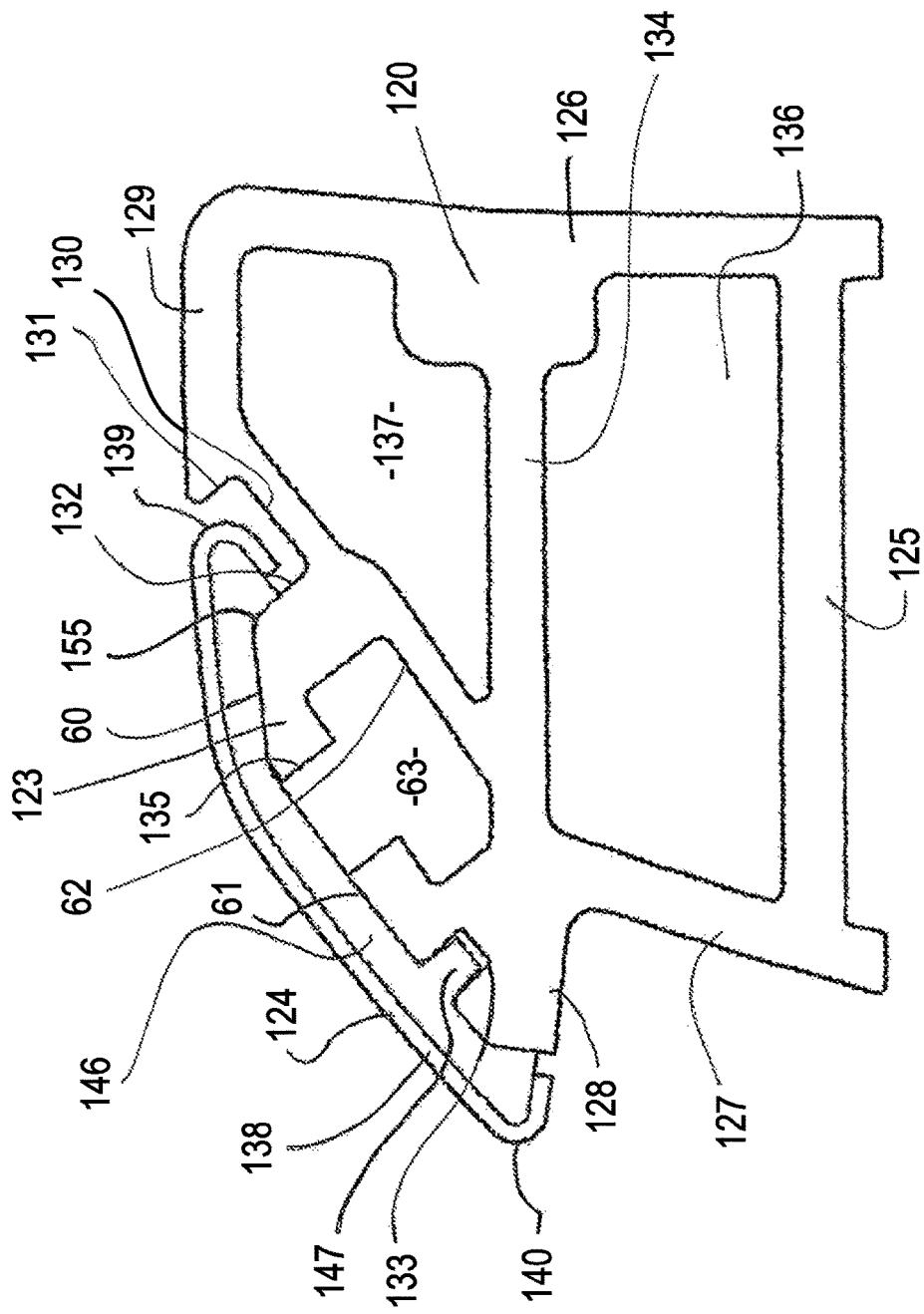
FIG. 7 shows a cross section through a roof rail and trim according to a second embodiment of the invention.

FIG. 7 shows a second embodiment of the invention, in which a roof rail 120 is adapted to be attached to the roof of a vehicle, to allow items to be carried on the roof via a crossbar clamped thereto. The roof rail 120 includes a trim attachment portion 123, to which trim 124 formed of brightware or the like can be attached.

The roof rail 120 of the first embodiment of the invention is formed by extrusion, in this example extruded aluminium, which provides a strong and light support. The roof rail 120 is formed so as to include a roof attachment portion 125, which is a plate-like sheet which, in use is attached to the roof by conventional means (e.g. bolts).

An inboard sidewall 126 extends upwardly, perpendicular to the roof attachment portion 125 and bulges outward (i.e. inboard) very slightly in its top half. On the opposite side of the roof attachment portion, an outboard sidewall 127 extends upwardly. Although it extends generally in the direction perpendicular to the roof attachment portion 125, the outboard sidewall 127 extends less perpendicularly than the inboard sidewall 126, instead extending inwardly (i.e. inboard) so as to define an acute angle with respect to the plane of the roof attachment portion 125.

The outboard sidewall 127 is of only about half the height of the inboard sidewall 126 and at its top, an outwardly extending projecting portion 128, in the form of a ridge, projects outboard from the roof rail 120. On the other hand, at the top of the inboard sidewall 126, a top wall 129 is formed. The top wall 129 extends outwardly (i.e. outboard) from the inboard sidewall 126, generally perpendicular to the plane of the inboard sidewall 126 and parallel to the plane of the roof attachment portion 125. The top wall 129 only extends partially across the width of the roof rail 120, between about a third and half of the width of the roof rail 120 at its widest point (which is between the outer edge of the outwardly extending projecting portion 128 and the inner wall 126.

From the outermost edge of the top wall 129, a recess 130 is formed. The recess is formed as a groove which extends inwardly and inboard, i.e. towards the inboard wall 126, such that the inwardly extending wall 131 of the groove forms an acute angle with the plane of the top wall 129. The opposite side of the groove 132 is formed by the trim attachment portion 123 of the roof rail 120. The recess 130 is of roughly square cross section, such that its depth both on the side 131 bounded by the top wall 129 and the side 132 bounded by the trim attachment portion 123 is roughly equal (the side bounded by the trim attachment portion is just slightly deeper). Accordingly, owing to the direction in which the groove extends (i.e. towards the inboard sidewall 126), the top of the groove on the side 132 bounded by the trim attachment portion 123 is lower than the top of the groove on the side 131 bounded by the top wall 129.

The trim attachment portion 123 has a flat portion 60 extending outward in a plane parallel to the plane of the top wall 129, then has a portion 61 sloping downwardly (i.e. towards the plane of the roof attachment portion 125) and outwardly (i.e. outboard), to meet the projecting portion 128 and form its upper surface. An alignment/support groove 133 extends inwardly perpendicularly to the trim attachment portion 123 in the region where it is meets the projecting portion 128.

Between the area where the projecting portion 128, the outboard side wall 127 and the trim attachment portion 123 meet and the mid-point of the inboard sidewall 126, a main brace 134 extends, forming a large chamber 136 bounded by the inner surfaces of the roof attachment portion 125, the lower half of the inner side wall 126, the outer side wall, 127, and the main brace 134.

A further brace 62 extends in line with the base of the groove 130 to meet with the main brace 134 and form two smaller chambers: the first smaller chamber 137 being defined by the inner surfaces of the upper half of the inboard sidewall 126, the top wall 129, the bottom of the groove 130, the bottom of the further brace 62 and the top of the main brace 134; and the second smaller chamber 63 being defined by the top surface of the secondary brace 62, the bottom surface of the sloping portion 61 of the trim attachment portion 123, and further portions in line with the grooves 130, 133.

The trim attachment portion 123 includes apertures 135 spaced along it as in the first embodiment and the apertures 135 are generally rectangular, with rounded edges and serve as fastening means to receive clips attached to the trim 124.

The trim 124 is again of a generally c-shaped cross section, having a main body portion 138 which extends between the outboard edge of the top wall 129 and beyond the outboard edge of the projecting portion 128; a tip 139 curving inwardly into the recess and back on itself and a tail 140 curving inwardly back towards the outboard edge of the projecting portion. The body portion 138 is slightly bent, initially following the line of the top wall, before curving downwards so as to end in line with the plane of the projecting portion 128

The same clips 41 shown in FIG. 6 and discussed above, attach the trim 124 to the rail 120. The clips 41 are attached to the trim 124 by means of a connector 146.

The connector 146 has an outer surface which conforms with the inner surface of the body portion 138 of the trim 124 and the grooves formed by the tip 139 and the tail 140 of the trim 124, so as to be held in place between them. The connector 146 associated with the trim 124 is also provided with a tongue 147, (located between the clip 41 and the tail 140 of the trim 124) which mates with the alignment/support groove 133 on the roof rail 120 to act as an aligner and a support, aligning the trim 124 on the roof rail 120 and supporting it in position. At the other end of the connector 146, located between the clip 41 and the tip 129 of the trim 124, a guide surface 155 is formed which mates with the corner of the recess 130 formed by the trim attachment portion 123, so as to hold the trim 124 in the correct position with respect to the top surface 129 of the roof rail 120.

The crossbar 22 of the first embodiment may be clamped to the roof rail 120 of the second embodiment in the same manner.

The above embodiments are described by way of example only. Many variations are possible without departing from the scope of the invention as defined in the appended claims.

The invention claimed is:

1. A roof rail attached to a roof of a vehicle and extending along a length of the vehicle, comprising:
   a roof attachment portion;
   an inboard sidewall and an outboard sidewall;
   a projecting portion projecting outwardly from the outboard sidewall;
   a top wall extending from the inboard side wall, wherein the outboard sidewall is adapted to bear an inward force from a clamp associated with a crossbar and the roof rail comprises a trim attachment portion which extends between the top wall and the projecting portion; and
a trim attached to the trim attachment portion.

2. A roof rail according to claim 1 wherein the trim attachment portion extends between an inward surface of the top wall and the projecting portion.

3. A roof rail according to claim 1 wherein the trim attachment portion extends between the top wall and an inward surface of the projecting portion.

4. A roof rail according to claim 1 further comprising a brace extending between the projecting portion and the inboard sidewall and the trim attachment portion extends between the brace and the top wall.

5. A roof rail according to claim 1 wherein the trim attachment portion is provided with fastening apparatus to attach the trim spaced along its length.

6. A roof rail according to claim 1 wherein the trim attachment portion is provided with a trim support for supporting and/or aligning the trim.

7. A roof rail according to claim 1 wherein the top wall of the roof rail is be less than or half of the width of the roof rail at its widest portion.

8. A roof rail according to claim 1 further comprising a brace extending between the inboard sidewall and the trim attachment portion.

9. A roof rail according to claim 1 wherein the trim is generally c-shaped in cross section, having a main body portion which extends between the outboard edge of the top wall and beyond the outboard edge of the projecting portion; a tip curving inwardly into a recess inward of the top wall of the roof rail and a tail curving inwardly towards the outboard edge of the projecting portion.

10. A roof rail according to claim 1 wherein the trim comprises fastening apparatus to fasten the trim to the trim attachment portion.

11. A roof rail according to claim 10 wherein the fastening apparatus comprises clips adapted to clip to apertures in the trim attachment portion.

12. A roof rail according to claim 1 wherein the trim comprises an aligner for aligning with, and to be supported by, a trim support associated with the trim attachment portion.

* * * * *